US006374964B2

(12) United States Patent
Mustalahti et al.

(10) Patent No.: US 6,374,964 B2
(45) Date of Patent: Apr. 23, 2002

(54) HOLDING BRAKE FOR A TRACTION SHEAVE ELEVATOR

(75) Inventors: Jorma Mustalahti; Harri Hakala, both of Hyvinkää; Esko Aulanko, Kerava, all of (FI)

(73) Assignee: Kone Corporation, Helsinki (FI)

( * ) Notice: Subject to any disclaimer, the term of this patent is extended or adjusted under 35 U.S.C. 154(b) by 0 days.

(21) Appl. No.: 09/886,387

(22) Filed: Jun. 22, 2001

Related U.S. Application Data

(63) Continuation of application No. PCT/FI99/01075, filed on Dec. 22, 1999.

(30) Foreign Application Priority Data

Dec. 23, 1998 (FI) .................................................. 982788

(51) Int. Cl.$^{7}$ .............................. B60T 8/72; B66B 1/32
(52) U.S. Cl. ........................ 188/186; 188/161; 187/288
(58) Field of Search ................................ 187/288, 292; 188/158, 161, 163, 184, 185, 186

(56) References Cited

U.S. PATENT DOCUMENTS

| | | | | |
|---|---|---|---|---|
| 3,720,293 A | | 3/1973 | Hikida et al. | |
| 5,014,828 A | | 5/1991 | Baldassarre | |
| 5,433,297 A | * | 7/1995 | Kuivamaki | 188/71.8 |
| 5,717,174 A | | 2/1998 | Ramos | |
| 6,155,386 A | * | 12/2000 | Hirai et al. | 188/161 |
| 6,182,803 B1 | * | 2/2001 | Hirai et al. | 188/171 |
| 6,202,804 B1 | * | 3/2001 | Dropmann et al. | 188/171 |

FOREIGN PATENT DOCUMENTS

| | | |
|---|---|---|
| DE | 19622983 | 11/1997 |
| DE | A19646493 | 5/1998 |
| JP | 4219535 | 8/1992 |
| JP | 6048669 | 2/1994 |

* cited by examiner

*Primary Examiner*—Christopher P. Schwartz
(74) *Attorney, Agent, or Firm*—Birch, Stewart, Kolasch & Birch, LLP

(57) ABSTRACT

Holding brake for a traction sheave elevator, comprising a brake body (1), a movable frame (2) movably mounted in the brake body, a brake pad (3) attached to the movable frame, a pulling element (4) mounted on the brake body for pulling the movable frame toward the brake body and a compressing element (5) mounted between the brake body and the movable frame and serving to move the movable frame away from the brake body and press the brake pad attached to the movable frame against the brake surface (6). A gap (9) is provided between the movable frame surface (7) oriented in the direction of motion of the movable frame (2) and a counter surface (8) oriented in a corresponding direction, in which gap (9) is fitted a damping element (10) which is in contact with both surfaces to damp the motion of the movable frame.

8 Claims, 1 Drawing Sheet

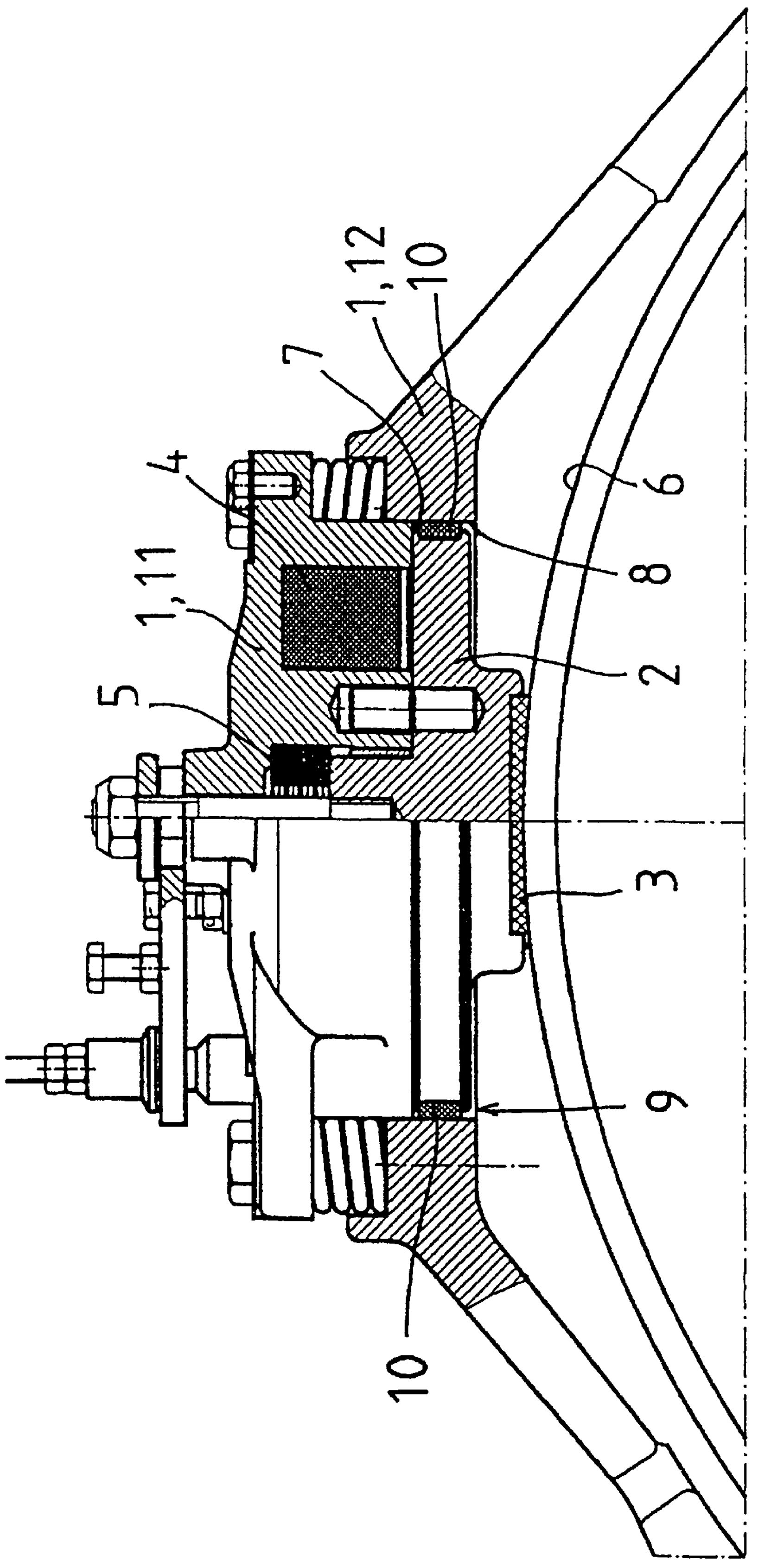
1,12
10
7
4
6
1,11
8
5
2
3
9
10

HOLDING BRAKE FOR A TRACTION SHEAVE ELEVATOR

This application is a Continuation of PCT International Application No. PCT/FI99/01075 filed on Dec. 22, 1999, which was not published in English and which designated the United States and on which priority is claimed under 35 U.S.C. §120, the entire contents of which are hereby incorporated by reference.

BACKGROUND OF THE INVENTION

The present invention relates to a holding brake for a traction sheave elevator, as defined in the preamble of claim 1.

The function of the holding brake is to hold the elevator car immovable at a floor and to stop the car or prevent it from moving during a power failure. For this reason, the braking effect of the holding brake is based on a mechanical compressing element, such as a spring, which keeps the brake engaged when no external forces are acting upon it. As the holding brake is activated every time when the car arrives at a floor and released every time when the car leaves a floor, its operation must be as fast, accurate and noiseless as possible so that the passengers in the elevator cannot perceive it.

Therefore, the air gap between the brake shoe of the holding brake and the brake surface on the traction sheave or a possible separate brake wheel must be as small as possible. This allows fast braking, a low impact energy of the brake shoe and as noiseless a braking action as possible.

As the holding brake must also be capable of stopping a moving car e.g. in the case of a power failure, the braking force of the holding brake, i.e. the compressive force of the spring used in it, must be relatively large. Therefore, when the brake shoe is pressed against the brake surface, this generally tends to generate some kind of noise or vibration.

BRIEF SUMMARY OF THE INVENTION

The object of the invention is to eliminate the drawbacks referred to above. A specific object of the invention is to disclose a new type of structure for use in a holding brake for a traction sheave elevator, designed to damp the noise and vibration generated by the operation of the holding brake.

As for the features characteristic of the invention, reference is made to the claims.

The holding brake of the invention for a traction sheave elevator comprises a brake body, a movable frame movably connected to the brake body, a brake pad attached to the movable frame, a pulling element, such as e.g. an electromagnet, mounted on the brake body to draw the movable frame toward the brake body, and a compressing element, such as a mechanical spring, between the brake body and the movable frame for moving the movable frame away from the brake body and pressing the brake pad attached to the movable frame against the brake surface. According to the invention, the movable frame comprises a surface oriented in the direction of its motion and the brake body comprises a counter surface oriented in a corresponding direction, with a gap left between these surfaces so that the surfaces are not in direct contact with each other, a damping element being fitted in the gap between said surfaces so that it is in contact with both surfaces to damp the motion of the movable frame.

The gap between the surfaces preferably has a uniform width in the direction of motion of the movable frame.

Likewise, the gap preferably forms a ring around the movable frame, in which case the damping element surrounds the movable frame like a ring. However, it is also possible to use a damping element only extending over a part of the perimeter of the movable frame.

DETAILED DESCRIPTION OF THE DRAWINGS

The gap, i.e. the movable frame surface oriented in the direction of motion and/or the counter surface of the brake body can be provided with a groove or other suitable space in which the damping element is partially fitted. The surfaces may also be straight and smooth, in which case the damping element is only tightly fitted and pressed in the gap between the surfaces.

The damping element is preferably is made of an elastic and flexible material, e.g. silicone, rubber or a suitable plastic material. Thus, when the surfaces are in tight contact with each other via an elastic element like this, the element will not prevent the movement of the surfaces relative to each other but only damp it.

Thus, the damping element of the invention reduces the force of the impact produced when the holding brake is actuated, in other words, it somewhat slows down the motion of the brake shoe but it does not eliminate or even significantly reduce the force of the pulling element or the compressing element. In the elastic and flexible material of the damping element, motion produces an internal friction which instantaneously damps and slows down the braking movement, in other words, the inertia of the mass of the damping element produces the desired damping effect. Still, the elastic damping element in the tight gap is deformed relatively quickly and, after the braking action, it does not reduce the braking force nor does it form an excessively large resistance to the force keeping the brake released.

In the following, the invention will be described in detail with reference to the drawing, which presents a partially sectioned view of a holding brake for a traction sheave elevator according to the invention.

The holding brake for a traction sheave elevator presented in the drawing comprises a brake body 1, which consists of a central body 11 and a peripheral frame 12 surrounding it in a ring-like fashion. Movably mounted inside the brake body 1 is a movable frame 2 with a brake pad 3 attached to its outer surface. Mounted in the central body is a circular electromagnet 4, by means of which the movable frame can be pulled toward the central body. Moreover, between the central body 11 and the movable frame 2 there is a mechanical compressing element 5*a,* i.e. a spring, arranged to push the movable frame in a direction away from the brake body, thus pressing the brake pad 3 against the brake surface 6 of the traction sheave or a separate brake wheel.

In this embodiment, the movable frame 2 is substantially a plate-like structure of a circular shape, oriented in a position perpendicular to the direction of motion of the movable frame. Thus, the circumference of the movable frame 2 comprises a surface 7 oriented in the direction of its motion, and the interior surface of the peripheral frame 12 forms a ring-like counter surface 8 parallel to surface 7, so that an annular gap 9 surrounding the movable frame 2 is formed between these surfaces. Fitted in this gap is a damping element 10 according to the invention, i.e. a band, ring or piece of elastic, flexible material. It is tightly pressed and fitted in the gap 9 so that it is relatively firmly pressed against surface 7 and the counter surface 8.

In this way, the damping element 10 constitutes an element that damps, but does not prevent, the motion between surface 7 and its counter surface 8 in the direction of these surfaces. Moreover, the damping element functions as a sound insulator, stopping the propagation of sound waves in the metal structures.

In the foregoing, the invention has been described by way of example with reference to the attached drawing while different embodiments of the invention are possible within the scope of the inventive idea defined in the claims.

What is claimed is:

1. Holding brake for a traction sheave elevator, said brake comprising a brake body (1), a movable frame (2) movably mounted in the brake body, a brake pad (3) attached to the movable frame, a pulling element (4) mounted on the brake body for pulling the movable frame toward the brake body and a compressing element (5) mounted between the brake body and the movable frame and serving to move the movable frame away from the brake body and press the brake pad attached to the movable frame against the brake surface (6), characterized in that a gap (9) is provided between the movable frame surface (7) oriented in the direction of motion of the movable frame (2) and a counter surface (8) oriented in a corresponding direction, in which gap (9) is fitted a damping element (10) which is in contact with both surfaces to damp the motion of the movable frame.

2. Holding brake as defined in claim 1, characterized in that the gap (9) is of uniform width in the direction of motion of the movable frame (2).

3. Holding brake as defined in claim 1, characterized in that the gap (9) forms a circle around the movable frame (2).

4. Holding brake as defined in claim 1, characterized in that surface (7) and/or the counter surface (8) comprises a groove or a corresponding space in which the damping element (10) is fitted.

5. Holding brake as defined in claim 1, characterized in that the damping element (10) is a ring surrounding the movable frame (2).

6. Holding brake as defined in claim 1, characterized in that the damping element (10) is an elastic and flexible ring.

7. Holding brake as defined in claim 1, characterized in that the damping element (10) is made of silicone, rubber or plastic.

8. Holding brake as defined in claim 1, characterized in that the damping element (10) is tightly fitted and pressed in the gap (9) between surface (7) and the counter surface (8).

* * * * *